US008596186B2

(12) United States Patent
Legner et al.

(10) Patent No.: US 8,596,186 B2
(45) Date of Patent: Dec. 3, 2013

(54) ARRANGEMENT FOR HYDRAULIC ECCENTRIC ADJUSTMENT TO SET A PREDEFINED DISPLACEMENT FOR A HYDROSTATIC MOTOR

(75) Inventors: Jurgen Legner, Friedrichshafen (DE); Stephan Schinacher, Egesheim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 478 days.

(21) Appl. No.: 13/063,771

(22) PCT Filed: Sep. 29, 2009

(86) PCT No.: PCT/EP2009/062600

§ 371 (c)(1),
(2), (4) Date: Mar. 14, 2011

(87) PCT Pub. No.: WO2010/046209

PCT Pub. Date: Apr. 29, 2010

(65) Prior Publication Data

US 2011/0185888 A1 Aug. 4, 2011

(30) Foreign Application Priority Data

Oct. 20, 2008 (DE) ......................... 10 2008 042 956

(51) Int. Cl.
*F01B 13/06* (2006.01)
*F16D 31/02* (2006.01)

(52) U.S. Cl.
USPC ............................................... 91/497; 60/443

(58) Field of Classification Search
USPC ............................... 91/497, 504; 60/443, 445
See application file for complete search history.

(56) References Cited

U.S. PATENT DOCUMENTS

| | | | | |
|---|---|---|---|---|
| 3,771,423 | A | 11/1973 | Culberson | |
| 3,908,517 | A | 9/1975 | Wenbourne | |
| 7,415,821 | B2 | 8/2008 | Beck et al. | |
| 7,614,226 | B2 * | 11/2009 | Legner | 60/483 |
| 2006/0021817 | A1 * | 2/2006 | Legner | 180/307 |

FOREIGN PATENT DOCUMENTS

| | | | |
|---|---|---|---|
| DE | 2 326 768 | | 12/1973 |
| DE | 42 34 826 | C1 | 10/1992 |
| DE | 195 05 691 | A1 | 8/1996 |

(Continued)

OTHER PUBLICATIONS

German Search Report dated Oct. 26, 2011 with an English Translation of Relevance Indicated in German Search Report. 5 pages.

*Primary Examiner* — Michael Leslie
(74) *Attorney, Agent, or Firm* — Davis & Bujold, PLLC; Michael J. Bujold

(57) ABSTRACT

An arrangement for a hydraulic eccentric adjustment for setting a predetermined displacement volume in a hydrostatic motor and, in particular a radial piston motor (1). The arrangement has an adjustment device which, to position an eccentric element (2), can be acted upon with pressure medium via a shuttle valve (5) such that at least one actuating piston (19), of an adjustment cylinder (3) that can be acted upon on both opposed sides is provided, as the adjustment device. A first pressure chamber (7) of the cylinder is connected to a first supply line (9), for setting a smaller displacement volume while a second opposed pressure chamber (8) is connected to a second supply line (10), for setting a larger displacement volume. The two supply lines (9, 10) are connected to one another by a connecting line (11).

7 Claims, 1 Drawing Sheet

(56) References Cited

FOREIGN PATENT DOCUMENTS

| | | | |
|---|---|---|---|
| DE | 101 38 519 | A1 | 3/2003 |
| DE | 102 19 849 | A1 | 11/2003 |
| EP | 0 530 842 | A2 | 3/1993 |
| WO | 94/09293 | A1 | 4/1994 |

* cited by examiner

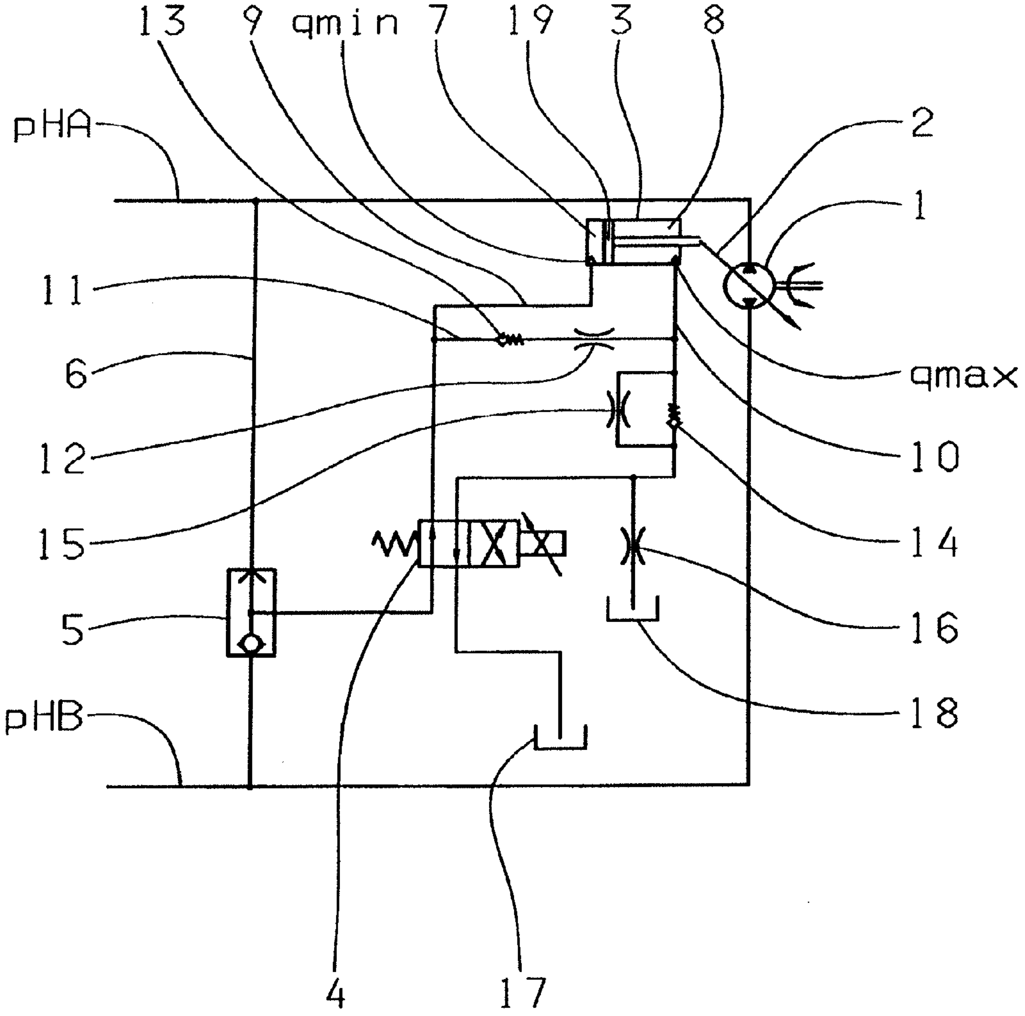
13
9
qmin
7
19
3
8
pHA
2
1
11
6
qmax
12
10
15
14
5
16
18
pHB
4
17

ARRANGEMENT FOR HYDRAULIC ECCENTRIC ADJUSTMENT TO SET A PREDEFINED DISPLACEMENT FOR A HYDROSTATIC MOTOR

This application is a National Stage completion of PCT/EP2009/062600 filed Sep. 29, 2009, which claims priority from German patent application serial no. 10 2008 042 956.2 filed Oct. 20, 2008.

FIELD OF THE INVENTION

The present invention concerns an arrangement for hydraulic eccentric adjustment for setting a predetermined displacement volume in a hydrostatic motor, in particular a radial piston motor.

BACKGROUND OF THE INVENTION

For example, from the document U.S. Pat. No. 3,771,423 a pivot-pin stabilizing device for a radial piston pump or a radial piston motor is known. The stabilizing device comprises an endplate on the housing which attaches the pivot-pin bearing block. Furthermore, a mechanism for adjusting the position of the pivot-pin, relative to the housing, is provided, this mechanism being arranged on the pivot-pin bearing block. By means of the said mechanism the position of the pivot-pin can be adjusted manually.

Moreover, from automotive technology it is known that hydrostatic motors of radial piston design are used in transmissions. The used motors have an arrangement for eccentric adjustment with which the displacement volume can be set within specified limits. The eccentric adjustment takes place on an eccentric element supported on the inside, which can be positioned by means of an adjusting device in the direction of minimum and maximum eccentricity. The adjustment takes place by means of the pressure medium supply of the motor, which is connected to the adjusting device by a changeover valve. For this, a volume flow of the pressure medium is set which corresponds to the desired adjustment. When magnetic seat valves are used for controlling the motor, these are alternately switched on and off. The pressure medium is held in during adjustment and only switched through when, because of leakages, the actual displacement volume differs from the desired displacement volume or when it requires adjustment. However, continuous adjustment is not possible with the known arrangement.

Furthermore, the disadvantage arises that the force vector resulting from the working pistons of the motor, which acts upon the eccentric element because of external loads, is orientated in the rotation direction tangentially to the eccentricity. Because of this, a component thereof acts in the direction of maximum or higher, or minimum or lower displacement volume or displacement volume flow. This is opposed by frictional forces and the supporting forces of the adjusting device. In the case of a motor with five working pistons, due to the external loads, the adjusting device is loaded and unloaded in each direction ten times during a single revolution of the motor by virtue of the system. But since only one side of the adjusting device is supplied with pressure medium, the eccentric element shifts and an undesired tendency to vibrate occurs in the system. Moreover, with the known arrangement the displacement volume cannot be regulated reliably.

SUMMARY OF THE INVENTION

The purpose of the present invention is to propose an arrangement of the type described at the start, which enables continuous and infinitely variable adjustment of the displacement volume or displacement volume flow and, during this, prevents the occurrence of any tendency to vibrate.

Accordingly, an arrangement is proposed for hydraulic eccentric adjustment, for setting a predetermined displacement volume in a hydrostatic motor, in particular a radial piston motor or the like, with an adjusting device which can be acted upon with pressure medium via a shuttle valve for positioning an eccentric element. According to the invention, as the said adjusting device at least one actuating piston of an adjustment cylinder, that can be actuated open on both sides, or the like is provided, one pressure chamber of the said cylinder being connected to a first supply line for setting a smaller displacement volume or volume flow, while its other pressure chamber is connected to a second supply line for setting a larger displacement volume or volume flow, the two supply lines being connected to one another by a connecting line or the like.

With the arrangement according to the invention, in which the two sides or pressure chambers of the adjustment cylinder are connected to one another by the connecting line, it can be ensured that sufficient pressure medium, for example oil or the like, is present in both pressure chambers so that forces imposed from outside can be supported at every point or at any rotation angle of the motor. Thus, the arrangement according to the invention not only prevents the occurrence of vibrations but also enables continuous, infinitely variable adjustment of the desired displacement volume. It is also possible that instead of one actuating piston, a plurality of actuating pistons with correspondingly associated pressure chambers or the like are used and, in that case, the layout of the supply lines and the connecting line is adapted accordingly.

A possible further development of the invention can provide that the second supply line has associated with it a throttle element or the like on the outlet side. In this way the pressure medium or oil can be impeded from draining away into a collecting tank. For example, a nozzle or the like can be used as the throttle element.

To ensure highly dynamic adjustment of the eccentricity of the eccentric element or eccentric ring, for example it can be provided that, for example parallel to the throttle element, a non-return valve or suchlike is arranged in the second supply line or the inlet or return line leading to the pressure chamber, for setting a maximum displacement volume. For example, a pre-stressed one-way valve can be used.

In a related design of the invention, it can be provided that for example the supply-side end of the connecting line or the first supply line is connected to at least one flow valve with two through-flow directions or the like, which is connected via a shuttle valve or suchlike to the pressure medium supply of the motor. For example, a double-check valve or similar can be used as the said shuttle valve. However, other control elements too could be used.

To produce a necessary pressure drop between the pressure chambers of the adjustment cylinder, it can for example be provided that the connecting or short-circuit line has a throttle element or the like. For example, a nozzle can be used as the said throttle element. Preferably, the nozzle is designed such that a pressure drop is produced which acts in opposition to the self-adjusting behavior of the eccentric element.

A related design of the present invention can provide that the dynamic adjustment of the eccentricity is improved further in that, for example, in addition at least one non-return valve is arranged in series with the throttle element in the connecting line. In particular, from the combination of using a pre-stressed non-return valve in series with the throttle element in the connecting line and in addition a pre-stressed non-return valve parallel to the throttle element in the second supply line, with the arrangement according to the invention the adjustability of the eccentricity is optimized further so that a high level of control quality is achieved.

In the arrangement according to the invention, the use of a run-out nozzle or the like, for example on the outlet side of the second supply line before a collecting tank, can enable damping in the hydraulic control arrangement, preferably in the area of an overlap in the flow valve for controlling the actuating piston.

BRIEF DESCRIPTION OF THE DRAWING

Below, the invention is explained further with reference to the drawing. The single FIGURE illustrating the invention shows a possible embodiment variant of an arrangement, according to the invention, for hydraulic eccentric adjustment for setting a predetermined displacement volume in a hydrostatic motor, in particular a radial piston motor 1. Other fields of application are also conceivable.

DETAILED DESCRIPTION OF THE PREFERRED EMBODIMENTS

The arrangement according to the invention comprises an adjustment device which comprises at least one actuating piston 19 of an adjustment cylinder 3 that can be acted upon on both sides. The eccentricity of an eccentric element or eccentric ring 2 of the radial piston engine 1 can be adjusted continuously with the actuating piston 19. In the figure, the eccentric element 2 is indicated only schematically by an arrow. For the appropriate positioning of the eccentric element 2, the adjustment or actuating piston 19 is acted upon by a pressure medium or oil via a flow valve 4 having two through-flow directions. A 4/2-way valve is preferably used as the flow valve 4.

The flow valve 4 is connected, by a shuttle valve 5, to the pressure medium supply 6 of the radial piston motor 1. In the normal way, the pressure medium supply 6 is connected to the working pistons (not shown further) of the radial piston motor 1 and has the different pressures pHA and pHB for operation. The shuttle valve 5 is in the form of a double-check valve.

According to the invention it is provided that the actuating piston 19 can be acted upon by pressure medium on both sides. For this, the adjustment cylinder 3 has a first pressure chamber 7 for setting a minimum or smaller displacement volume and a second pressure chamber 8 for setting a maximum or higher displacement volume in the radial piston motor 1. In the figure this is denoted by qmin and qmax.

The first pressure chamber 7 is supplied with pressure medium, via a first supply line 9, and the second pressure chamber 8, via a second supply line 10. In the arrangement according to the invention, the supply line 9 is connected, by a connecting line 11, to the supply line 10, this connecting line 11 also being called the short-circuit line.

The connecting line 11 ensures that sufficient oil is present on both sides, i.e., in both pressure chambers 7, 8 of the adjustment cylinder 3, so that forces imposed from outside can be supported at any rotation angle of the radial piston motor 1.

To produce the necessary pressure drop, a nozzle 12 is provided in the connecting line 11. To ensure highly dynamic adjustment of the eccentricity of the eccentric element 2, a pre-stressed non-return valve 13 is provided in series with the nozzle 12 in the connecting line 11. In addition, another pre-stressed non-return valve 14 is provided, parallel to another nozzle 15 in the inlet or return line of the pressure chamber 8, or second supply line 10.

In the flow valve 4, the overlap of a slider is selected such that no, or only minimal dead times occur, i.e., the inlet or supply lines 9, 10 are not blocked. This prevents non-uniformities in the control or regulation.

With the selected arrangement, it is ensured that the actuating piston 19 and the pressure chambers 7, 8 of the adjustment cylinder 3 have a sufficient oil supply at every operating point and the external loads can be supported. Moreover, highly dynamic adjustment behavior is ensured. Furthermore, with the arrangement according to the invention a high degree of regulation efficacy is achieved. This means that the arrangement can regulate any displacement volume or displacement flow dynamically and continuously.

A run-off nozzle 16 serves to produce damping in the overlap area of the 4/2-way valve 4. The run-off nozzle 16 is arranged on the outlet side in the second supply line 10, before a collection tank 18. Another collection tank 17 is connected to the flow valve 4.

INDEXES

1 Radial piston motor
2 Eccentric element
3 Adjustment cylinder
4 Flow valve
5 Shuttle valve
6 Pressure medium supply
7 Pressure chamber for minimum displacement volume
8 Pressure chamber for maximum displacement volume
9 Supply line
10 Supply line
11 Connecting line
12 Throttle element or nozzle
13 Non-return valve
14 Non-return valve
15 Throttle element or nozzle
16 Run-off nozzle
17 Collecting tank
18 Collecting tank
19 Adjusting piston
pHA Drive pressures in the pressure medium supply
pHB Drive pressures in the pressure medium supply
qmin Minimum or lower displacement volume flow
qmax Maximum or higher displacement volume flow

The invention claimed is:

1. A radial piston motor (1), in which a predetermined displacement volume can be set by a hydraulic eccentric adjustment via an eccentric element (2), with an adjustment device by which, to position the eccentric element (2), the adjustment device can be acted upon by pressure medium via a shuttle valve (5), wherein the adjustment device comprises at least one actuating piston (19) that can be acted upon on opposed sides via an adjustment cylinder (3), the adjustment cylinder (3) has a first pressure chamber (7) which is connected to a first supply line (9) for setting a smaller displacement volume while a second pressure chamber (8), of the adjustment cylinder (3), is connected to a second supply line (10) for setting a larger displacement volume, the first and the second supply lines (9, 10) are connected to one another by a connecting line (11), the shuttle valve (5) is connected to a flow valve (4) and, in a first switching position of the flow valve (4), the first supply line (9) is connected to the pressure medium by the shuttle valve (5) and the second supply line (10) is connected to a collecting tank (17), and in a second switching position of the flow valve (4), the first supply line (9) is connected to the collecting tank (17) and the second supply line (10) is connected to the pressure medium by the shuttle valve (5), and a connecting throttle element (12) is arranged in the connecting line (11).

2. The arrangement according to claim 1, wherein at least one supply throttle element (15) is associated with the second supply line (10) on an outlet side thereof.

3. The arrangement according to claim 2, wherein the at least one supply throttle element (15) is arranged in the second supply line (10) parallel to a non-return valve (14).

4. The arrangement according to claim 1, wherein the first supply line (9) and the second supply line (10) are both connected to the flow valve (4) with two through-flow directions, and the flow valve (4) is directly connected to the pressure medium supply (6) of the radial piston motor (1) via the shuttle valve (5).

5. The arrangement according to claim 1, wherein at least one non-return valve (13) is arranged, in the connecting line (11), in series with the connecting throttle element (12).

6. The arrangement according to claim 5, wherein the at least one connecting throttle element (12) directly communicates with the second supply line (10).

7. The arrangement according to claim 1, wherein at least one run-off nozzle (16) is provide on an outlet side in the second supply line (10), before a run-off collection tank (18).

* * * * *